United States Patent
Juhl

(10) Patent No.: US 10,850,618 B2
(45) Date of Patent: Dec. 1, 2020

(54) CONNECTION MODULE FOR AN ELECTRICAL ENERGY STORAGE DEVICE, AND POWER SUPPLY SYSTEM

(71) Applicant: Volkswagen Aktiengesellschaft, Wolfsburg (DE)

(72) Inventor: Jochen Juhl, Lüdersfeld (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 310 days.

(21) Appl. No.: 15/849,591

(22) Filed: Dec. 20, 2017

(65) Prior Publication Data
US 2018/0186248 A1 Jul. 5, 2018

(30) Foreign Application Priority Data

Jan. 4, 2017 (DE) .................. 10 2017 200 050

(51) Int. Cl.
*B60L 3/00* (2019.01)
*B60L 3/04* (2006.01)
*B60L 58/10* (2019.01)
*B60L 3/12* (2006.01)

(52) U.S. Cl.
CPC ............ *B60L 3/00* (2013.01); *B60L 3/0038* (2013.01); *B60L 3/0092* (2013.01); *B60L 3/04* (2013.01); *B60L 3/12* (2013.01); *B60L 58/10* (2019.02); *B60L 2240/549* (2013.01); *Y02T 10/70* (2013.01)

(58) Field of Classification Search
None
See application file for complete search history.

(56) References Cited

U.S. PATENT DOCUMENTS 10,384,545 B2 * 8/2019 Schmelzer ............ G01R 31/14
2006/0151219 A1 7/2006 Khan et al.
(Continued)

FOREIGN PATENT DOCUMENTS

CA 2 368 901 A1 10/2000
CN 103180749 A 6/2013
(Continued)

OTHER PUBLICATIONS

Examination Report issued by the German Patent and Trademark Office for German Patent Application No. DE 10 2017 200 050.3, dated Oct. 6, 2017.
(Continued)

*Primary Examiner* — Jared Fureman
*Assistant Examiner* — Joel Barnett
(74) *Attorney, Agent, or Firm* — Manfred Beck, P.A.

(57) ABSTRACT

A connection module for an electrical energy storage device of a motor vehicle includes a first connection element and a second connection element for connecting to the electrical energy storage device and to a traction network. The connection module includes busbars which connect the first connection element and the second connection element to one another. The connection module further includes a primary current measurement element and a secondary current measurement element, wherein the secondary current measurement element operates contactlessly. A power supply system for a motor vehicle is also provided.

11 Claims, 2 Drawing Sheets

(56) References Cited

U.S. PATENT DOCUMENTS

| | | | | |
|---|---|---|---|---|
| 2009/0212770 A1* | 8/2009 | Koyama | ............... | G01R 33/09 |
| | | | | 324/249 |
| 2012/0262151 A1 | 10/2012 | Mandic et al. | | |
| 2013/0335100 A1* | 12/2013 | Boehm | ............... | G01R 35/00 |
| | | | | 324/537 |
| 2014/0009090 A1* | 1/2014 | Ashida | ................ | H02P 31/00 |
| | | | | 318/139 |
| 2014/0083993 A1 | 3/2014 | Maier et al. | | |
| 2014/0210479 A1 | 7/2014 | Rink et al. | | |
| 2015/0233980 A1 | 8/2015 | Umetsu et al. | | |
| 2017/0355350 A1* | 12/2017 | Namou | ................ | H02J 7/0031 |
| 2018/0026251 A1 | 1/2018 | Hinterberger et al. | | |
| 2018/0045793 A1* | 2/2018 | Herics | ................ | G01R 33/096 |

FOREIGN PATENT DOCUMENTS

| | | |
|---|---|---|
| CN | 103797373 A | 5/2014 |
| DE | 199 14 772 A1 | 10/2000 |
| DE | 10108640 A1 | 9/2002 |
| DE | 10 2006 000 796 A1 | 8/2006 |
| DE | 10 2012 212 367 A1 | 1/2013 |
| EP | 1213189 A1 | 6/2002 |
| EP | 2381264 A1 | 10/2011 |
| EP | 2511714 A2 | 10/2012 |
| WO | 2012/038161 A1 | 3/2012 |
| WO | 2012/152782 A1 | 11/2012 |
| WO | 2016/131764 A1 | 8/2016 |
| WO | 2016/139028 A1 | 9/2016 |

OTHER PUBLICATIONS

Search Report dated Nov. 8, 2019, issued by the State Intellectual Property Office of People's Republic of China for Chinese Patent Application No. 201810007438.0 which is related to U.S. Appl. No. 15/849,591.

Office Action and machine translation thereof, dated Nov. 28, 2019, issued by the State Intellectual Property Office of People's Republic of China for Chinese Patent Application No. 201810007438.0 which is related to U.S. Appl. No. 15/849,591.

* cited by examiner

CONNECTION MODULE FOR AN ELECTRICAL ENERGY STORAGE DEVICE, AND POWER SUPPLY SYSTEM

CROSS-REFERENCE TO RELATED APPLICATIONS

This application claims the priority, under 35 U.S.C. § 119, of German Patent Application No. DE 10 2017 200 050.3, filed Jan. 4, 2017; the prior application is herewith incorporated by reference in its entirety.

BACKGROUND OF THE INVENTION

Field of the Invention

The invention relates to electrical energy storage devices for power supply systems in motor vehicles, in particular measures for redundant current measurement in such a power supply system.

Due to legal requirements, the functionality of sensors and actuators in motor vehicles must be continuously monitored. In particular, the monitoring of a current measurement in a traction network is carried out via a redundantly designed current measurement. While the primary current measurement is generally carried out with the aid of shunts, Hall sensors, or also shunts, may be used as secondary current sensors. However, Hall current sensors have the disadvantage that they are relatively inaccurate and thus make the diagnosis of a malfunction more difficult. On the other hand, the use of a shunt as a secondary amperemeter is relatively expensive, since a separate analog-digital converter is necessary for each shunt for a synchronous current measurement.

An additional option for performing a secondary current measurement is to provide an anisotropic magnetoresistance (AMR) sensor. However, current measurement methods based on AMR always require a U-shaped busbar for performing the current measurement, in order to create a magnetic field via the current flow which is sufficient for providing the required measurement accuracy, and in order to eliminate stray fields. The U-shape of the busbar must be provided separately; thus, the AMR sensor is generally coupled to busbars of the battery system as a separate component via a screw connection, or a corresponding shape of the busbar is required.

Generally, a shunt is provided for the primary current measurement and is connected to the battery unit via screw connections. The secondary current measurement has heretofore been arranged separately; thus, additional installation effort is created, in addition to the specially formed busbar.

SUMMARY OF THE INVENTION

It is accordingly an object of the invention to provide an improved battery connection module which is more simply configured and which allows a redundant current measurement.

With the foregoing and other objects in view there is provided, in accordance with the invention, a connection module for an electrical energy storage device of a motor vehicle, including:

a first connection element and a second connection element for connecting to the electrical energy storage device and to a traction network;

a plurality of busbars connecting the first connection element and the second connection element to one another;

a primary current measurement element; and a secondary current measurement element, the secondary current measurement element being a contactlessly operating current measurement element.

In other words, according to a first aspect of the invention, a connection module is provided for an electrical energy storage device of a motor vehicle, in particular for a traction battery, including:

a first and a second connection element for connecting to the electrical energy storage device and to a traction network;

multiple busbars which connect the first and the second connection element to one another;

a primary current measurement element; and a contactlessly operating secondary current measurement element.

According to another feature of the invention, the secondary current measurement element is configured as a magnetic field-sensitive current sensor.

According to a further feature of the invention, the magnetic field-sensitive current sensor is an anisotropic magnetoresistance sensor or a giant magnetoresistance sensor.

Thus, the secondary current measurement element may be configured as a magnetic field-sensitive current sensor, in particular as an AMR (anisotropic magnetoresistance) or GMR (giant magnetoresistance) sensor.

The aforementioned connection module is used for electrical coupling between an electrical energy storage device and a traction network of a motor vehicle. One idea of the aforementioned connection module is to additionally provide the connection module with a secondary current measurement, in that the terminals with which the traction battery is connected to the connection module are provided with a contactlessly operating secondary current measurement element, for example, an AMR sensor, for performing a current measurement. As a result, an additional busbar having a U-shape, which is generally used for arranging a current sensor which operates using an AMR measurement, may be eliminated. At the same time, existing busbars in the connection module may be used for measuring a battery current via the contactlessly operating secondary current measurement.

Via the provision of the contactlessly operating secondary current measurement within the battery connection module, the contactlessly operating current sensor may be isolated from the rest of the traction network.

According to another feature of the invention, the primary current measurement element is configured to have a measurement resistor, wherein the measurement resistor may be a shunt. The primary current measurement element may thus be in the form of a measurement resistor, in particular in the form of a shunt.

According to another feature of the invention, a housing encloses the connection module which includes the first connection element, the second connection element, the busbars, the primary current measurement element, and the secondary current measurement element. Thus, according to an embodiment of the invention, the battery connection module is provided as a separate unit which is encompassed by a housing.

According to another feature of the invention, the connection module includes at least one component selected from the group including an overcurrent protection device, a precharging circuit, and switching elements for breaking or completing a current flow through the busbars between the first connection element and the second connection element, wherein the component is connected to at least one of the busbars.

The connection module may thus furthermore include one or a plurality of the following components, which are connected to one or a plurality of the busbars:

an overcurrent protection device;

a switching unit for breaking or completing a current flow through the busbars between the first and second connection elements; and a precharging circuit.

Alternatively, the precharging circuit may also be implemented via a semiconductor having a corresponding controller, along with a separating element.

Furthermore, the secondary current measurement element may be disposed at contacts of the first connection element.

Thus according to a feature of the invention, the first connection element has contacts, wherein the secondary current measurement element is disposed at the contacts of the first connection element.

According to another feature of the invention, the first connection element has two contacts running parallel to one another, wherein the secondary current measurement element is disposed between the two contacts of the first connection element in order to detect a measurement magnetic field formed when a current flows.

It may thus be provided to arrange the secondary current measurement element between two contacts of the first connection element which are disposed in parallel to each other, in order to detect a measurement magnetic field which is formed when current flows.

According to another feature of the invention, the secondary current measurement element is disposed at two connection elements which are in parallel with one another, in order to detect a measurement magnetic field formed when a current flows.

According to an additional aspect of the invention, a power supply system for a motor vehicle is provided which includes an electrical energy storage device and the aforementioned connection module, and which is configured to electrically connect the electrical energy storage device to a traction network.

With the objects of the invention in view there is thus also provided, a power supply system for a motor vehicle, including:

an electrical energy storage device;

a connection module configured to electrically connect the electrical energy storage device to a traction network;

the connection module including a first connection element and a second connection element for connecting to the electrical energy storage device and to the traction network;

the connection module including a plurality of busbars connecting the first connection element and the second connection element to one another;

the connection module including a primary current measurement element; and the connection module including a secondary current measurement element, the secondary current measurement element being a contactlessly operating current measurement element.

According to another feature of the invention, the electrical energy storage device is a traction battery.

According to another feature of the invention, the power supply system includes a housing that encloses the connection module.

Although the invention is illustrated and described herein as embodied in a connection module and a power supply system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
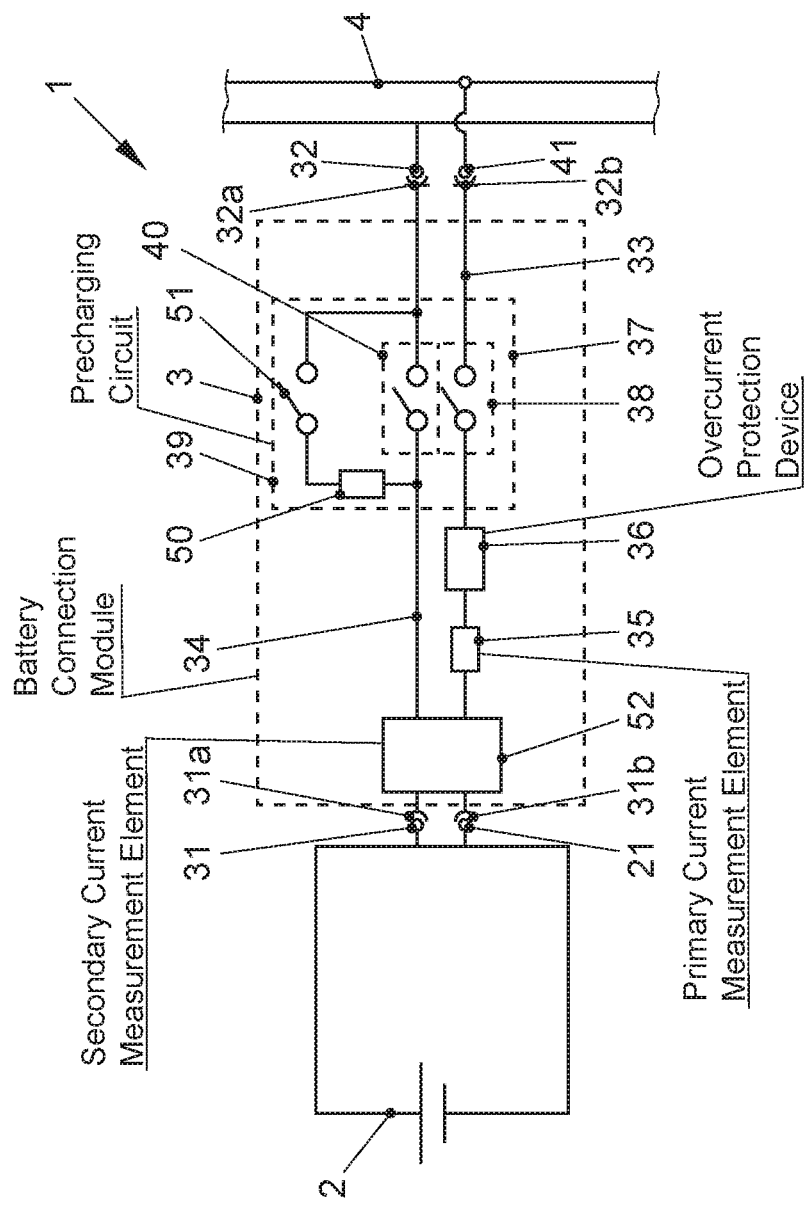
FIG. 1 is a schematic view of a battery system including a traction battery and a battery connection module according to the invention.

Referring now to the figures of the drawings in detail and first, particularly, to FIG. 1 thereof, there is shown a schematic representation of a power supply system 1 in the form of a battery system including an electrical energy storage device, in particular a traction battery 2. The traction battery 2 may be configured from a number of battery cells which are connected in series and/or in parallel. The traction battery 2 includes an electrical battery connection element 21 in the form of a contacting connection which may be configured as a screw connection or plug connection, in order to connect it to a battery connection module 3 (connection module). For this purpose, the battery connection module 3 includes a first electrical connection element 31 which has contacts 31a, 31b and which corresponds to the battery connection element 21 of the traction battery 2, so that an electrical connection may be established between the traction battery 2 and the battery connection module 3.

Furthermore, the battery connection module 3 includes a second connection element 32 having contacts 32a, 32b, in order to electrically connect the battery connection module 3 to a traction network 4. For this purpose, the traction network 4 is provided with a corresponding traction network connection element 41. The connection elements 21, 31, 32, 41 may be configured as detachable plug connections.

The battery connection module 3 includes a first and a second busbar 33, 34. The busbars essentially (electrically) connect the contacts 31a, 31b of the first connection element 31 to the contacts 32a, 32b of the second connection element 32 via corresponding busbars 33, 34. One of the busbars 33, 34, in the present exemplary embodiment the first busbar 33, is provided with a primary current measurement element 35, in order to measure a current flow through the first busbar 33. The primary current measurement element 35 may, for example, be configured as a shunt (measurement resistor). The current measurement is carried out by tapping and evaluating a voltage across the shunt.

Furthermore, an overcurrent protection device 36 may be provided in one of the busbars 33, 34, in order to ensure an overcurrent disconnection. The overcurrent protection device may, for example, be configured in the form of a fuse or a reusable overcurrent protection device.

Furthermore, the battery connection module 3 includes a switching unit 37, for example, two contactors 38 and 40 acting as switching elements (alternatively, they may be implemented via semiconductors), via which the two busbars 33, 34 are switched. One of the busbars includes a precharging circuit 39 which is in parallel with the switching element 38, the precharging circuit including a precharging resistor 50 which is connected in series and a precharging relay 51. The precharging circuit 39 is used to depress the increase in the current flow in the case of electrical coupling of the traction battery 2 to the traction network 4, in that the precharging relay 51 and the contactor 38 are initially switched on, and after a certain time delay, in particular when a precharging condition is met, the contactor 40 is switched on, so that it is possible to limit the abrupt current changes over the busbars 33, 34.

The battery connection module 3 is furthermore provided with a secondary current measurement element 52 which is preferably configured as a contactlessly operating current sensor, in particular as an AMR measurement element. The secondary current measurement element 52 is to be arranged in such a way that it is at a defined distance from the outgoing and return leads of the battery. As a result, the secondary current measurement element 52 is subjected to a magnetic field which is created by the current flow through the two busbars 33, 34. The arrangement of the secondary current measurement element 52 along the busbars 33, 34 is essentially arbitrary.

Figure 2:
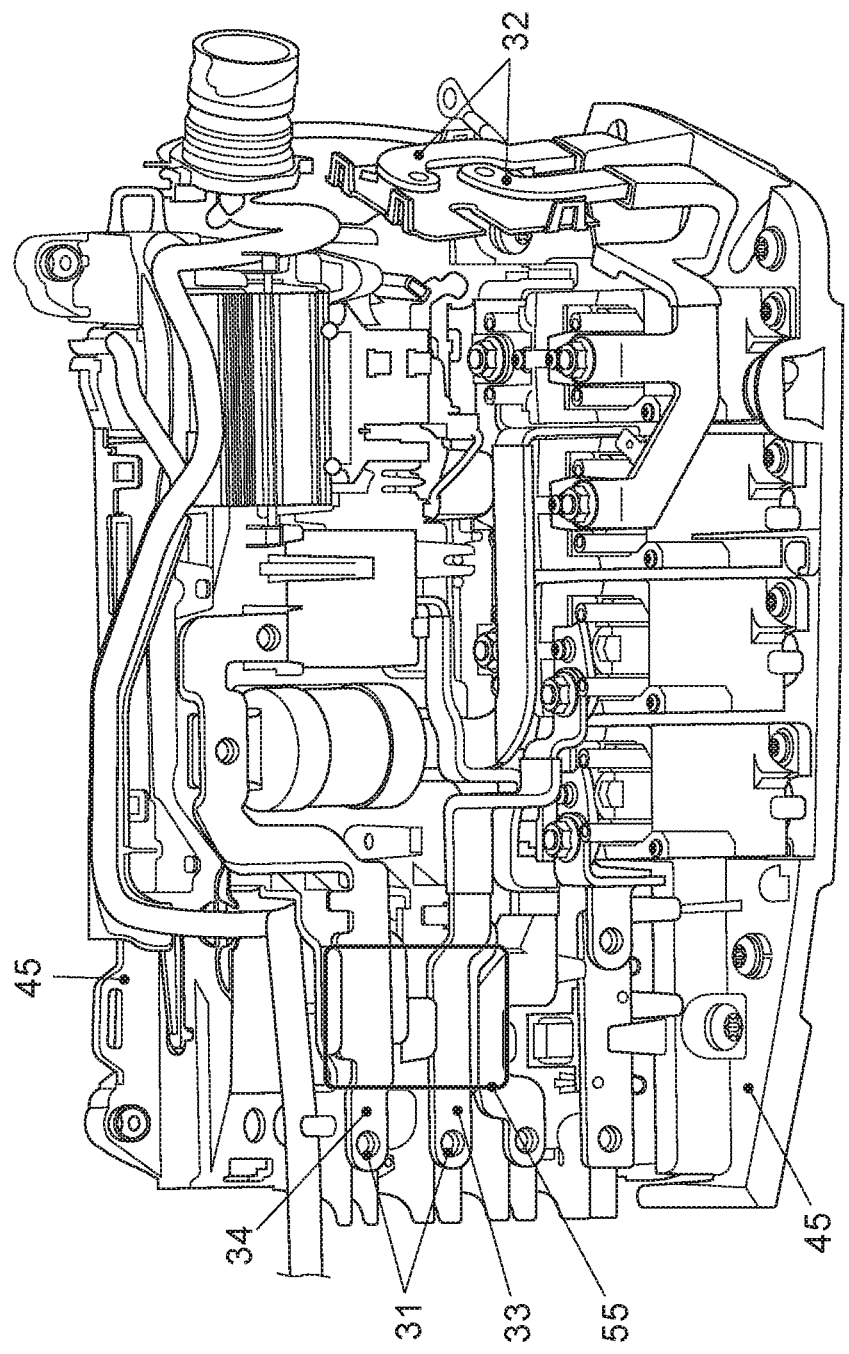
FIG. 2 is a top view onto an example of a battery connection module including a positioned AMR sensor according to the invention.

FIG. 2 shows a sectional view through a conventional battery connection module 3. The contacts 31a, 31b of the first connection element 31 for contacting the first and the second busbar 33, 34 are shown. A positioning of a secondary current measurement element 52 between the first and second busbars 33, 34, directly after the first connection element 31, is indicated via a corresponding rectangle 55. The battery connection module 3 is provided in a housing 45 which accommodates all of the above-described components.

Alternatively, the secondary current measurement element 52 may be disposed at the contacts 31a, 31b of the first connection element. In particular, two adjacent contacts 31a, 31b of the first connection element 31 may be used to dispose the secondary current measurement element 52 therebetween, in order to achieve a sufficient strength of a measurement magnetic field which is formed when current flows. As a result, an otherwise conventional u-shaped section of a busbar for forming the measurement magnetic field may be eliminated, whereby the manufacturing expenditure is reduced. It is essential that currents flowing through the two busbars 33, 34 can to be detected by the current measurement element 52.

LIST OF REFERENCE CHARACTERS

1 Battery system
2 Traction battery
3 Battery connection module
4 Traction network
21 Battery connection element
31 First connection element
31a, 31b Contacts
32 Second connection element
32a, 32b Contacts
33 First busbar
34 Second busbar
35 Primary current measurement element
36 Overcurrent protection device
37 Switching unit
38 Contactor
39 Precharging circuit
40 Contactor
41 Traction network connection element
45 housing
50 Precharging resistor
51 Precharging relay
52 Secondary current measurement element

What is claimed is:

1. A connection module for an electrical energy storage device of a motor vehicle, comprising:
    a first connection element and a second connection element for connecting to the electrical energy storage device and to a traction network;
    a plurality of busbars connecting said first connection element and said second connection element to one another;
    a primary current measurement element;
    a secondary current measurement element, said secondary current measurement element being a contactlessly operating current measurement element;
    said first connection element having a first contact and a second contact, said first contact and said second contact extending parallel to one another;
    said first contact being configured as a flat strip with a substantially rectangular cross section such that said first contact has narrow sides and wide sides;
    said second contact being configured as a flat strip with a substantially rectangular cross section such that said second contact has narrow sides and wide sides;
    a first one of said narrow sides of said first contact and a first one of said narrow sides of said second contact facing inwardly toward one another;
    a second one of said narrow sides of said first contact and a second one of said narrow sides of said second contact facing outwardly away from one another and being spaced further apart from one another than said first one of said narrow sides of said first contact and said first one of said narrow sides of said second contact; and
    said secondary current measurement element being disposed between said first contact and said second contact of said first connection element in order to detect a measurement magnetic field formed when a current flows through said busbars.

2. The connection module according to claim 1, wherein said primary current measurement element is configured to have a measurement resistor.

3. The connection module according to claim 2, wherein said measurement resistor is a shunt.

4. The connection module according to claim 1, further including a housing enclosing said first connection element, said second connection element, said busbars, said primary current measurement element, and said secondary current measurement element.

5. The connection module according to claim 1, further including at least one component selected from the group consisting of an overcurrent protection device, a precharging circuit, and switching elements for one of breaking and completing a current flow through said busbars between said first connection element and said second connection element, wherein said component is connected to at least one of said busbars.

6. The connection module according to claim 1, wherein said secondary current measurement element is configured as a magnetic field-sensitive current sensor.

7. The connection module according to claim 6, wherein said magnetic field-sensitive current sensor is one of an anisotropic magnetoresistance sensor and a giant magnetoresistance sensor.

8. A power supply system for a motor vehicle, comprising:
- an electrical energy storage device;
- a connection module configured to electrically connect said electrical energy storage device to a traction network;
- said connection module including a first connection element and a second connection element for connecting to said electrical energy storage device and to the traction network;
- said connection module including a plurality of busbars connecting said first connection element and said second connection element to one another;
- said connection module including a primary current measurement element;
- said connection module including a secondary current measurement element, said secondary current measurement element being a contactlessly operating current measurement element;
- said first connection element having a first contact and a second contact, said first contact and said second contact extending parallel to one another;
- said first contact being configured as a flat strip with a substantially rectangular cross section such that said first contact has narrow sides and wide sides;
- said second contact being configured as a flat strip with a substantially rectangular cross section such that said second contact has narrow sides and wide sides;
- a first one of said narrow sides of said first contact and a first one of said narrow sides of said second contact facing inwardly toward one another;
- a second one of said narrow sides of said first contact and a second one of said narrow sides of said second contact facing outwardly away from one another and being spaced further apart from one another than said first one of said narrow sides of said first contact and said first one of said narrow sides of said second contact; and
- said secondary current measurement element being disposed between said first contact and said second contact of said first connection element in order to detect a measurement magnetic field formed when a current flows through said busbars.

9. The power supply system according to claim 8, wherein said electrical energy storage device is a traction battery.

10. The power supply system according to claim 8, further including a housing enclosing said connection module.

11. A connection module for an electrical energy storage device of a motor vehicle, comprising:
- a first connection element and a second connection element for connecting to the electrical energy storage device and to a traction network;
- a first busbar and a second busbar connecting said first connection element and said second connection element to one another;
- a primary current measurement element;
- a secondary current measurement element, said secondary current measurement element being a contactlessly operating current measurement element;
- a portion of said first busbar extending in parallel to a portion of said second busbar;
- said portion of said first busbar being configured as a flat strip with a substantially rectangular cross section such that said portion of said first busbar has narrow sides and wide sides;
- said portion of said second busbar being configured as a flat strip with a substantially rectangular cross section such that said portion of said second busbar has narrow sides and wide sides;
- a first one of said narrow sides of said portion of said first busbar and a first one of said narrow sides of said portion of said second busbar facing inwardly toward one another;
- a second one of said narrow sides of said portion of said first busbar and a second one of said narrow sides of said portion of said second busbar facing outwardly away from one another and being spaced further apart from one another than said first one of said narrow sides of said portion of said first busbar and said first one of said narrow sides of said portion of said second busbar; and
- said secondary current measurement element being disposed between said portion of said first busbar and said portion of said second busbar in order to detect a measurement magnetic field formed when a current flows through said busbars.

* * * * *